United States Patent
Herscovitz et al.

(10) Patent No.: US 8,977,252 B1
(45) Date of Patent: *Mar. 10, 2015

(54) SYSTEM AND METHOD FOR AUTOMATIC DETECTION AND RECOVERY OF MALFUNCTION IN MOBILE DEVICES

(75) Inventors: Eli Herscovitz, Kochav Yair (IL); Irit Rapaport, Givataim (IL)

(73) Assignee: Gryphonet Ltd., Tel Aviv (IL)

( * ) Notice: Subject to any disclaimer, the term of this patent is extended or adjusted under 35 U.S.C. 154(b) by 1003 days.

This patent is subject to a terminal disclaimer.

(21) Appl. No.: 11/773,753

(22) Filed: Jul. 5, 2007

Related U.S. Application Data (60) Provisional application No. 60/818,511, filed on Jul. 6, 2006.

(51) Int. Cl.
*H04W 24/00* (2009.01)

(52) U.S. Cl.
USPC .......................................... 455/423; 455/425

(58) Field of Classification Search
CPC ........ G01R 31/02; G01R 31/08; G01R 11/25; G01R 22/068; G01R 31/2836; G01R 31/318342; G01R 31/3275; H02H 3/066
USPC ...................... 455/423, 425; 714/30, 4.5–6.3, 714/6.32–31, 37–57, E11.001–E11.22; 379/1.01–35; 701/29.1–34.4; 702/58, 702/59, 184, 185; 380/2
See application file for complete search history.

(56) References Cited

U.S. PATENT DOCUMENTS

| | | | |
|---|---|---|---|
| 5,974,092 A * | 10/1999 | Roos et al. ..................... 375/272 |
| 6,128,555 A * | 10/2000 | Hanson et al. .................. 701/13 |
| 6,178,522 B1 * | 1/2001 | Zhou et al. ..................... 714/12 |
| 6,269,396 B1 * | 7/2001 | Shah et al. ..................... 709/223 |
| 6,385,467 B1 * | 5/2002 | Yugami ......................... 455/567 |
| 6,775,542 B1 * | 8/2004 | Vilander et al. ............... 455/423 |
| 6,851,072 B2 * | 2/2005 | Lasserre et al. ................. 714/10 |
| 7,046,997 B2 * | 5/2006 | Bahr ............................. 455/418 |
| 7,113,993 B1 * | 9/2006 | Cappiello et al. ............. 709/227 |
| 7,209,737 B2 * | 4/2007 | Cho .............................. 455/425 |
| 7,415,539 B2 * | 8/2008 | Rabbers et al. ............... 709/248 |
| 7,478,266 B2 * | 1/2009 | Gatto et al. .................... 714/6.1 |
| 7,489,923 B2 * | 2/2009 | Varanda ........................ 455/418 |
| 7,561,877 B2 * | 7/2009 | Cassett et al. ................. 455/423 |
| 7,689,981 B1 * | 3/2010 | Gustafson ..................... 717/168 |
| 2002/0010880 A1 * | 1/2002 | Williams ........................ 714/43 |
| 2002/0049053 A1 * | 4/2002 | Nomura et al. ................ 455/423 |
| 2002/0072359 A1 * | 6/2002 | Moles et al. .................. 455/425 |
| 2002/0129042 A1 * | 9/2002 | Bradshaw et al. ............. 707/200 |
| 2003/0109243 A1 * | 6/2003 | Chang et al. .................. 455/343 |
| 2003/0236826 A1 * | 12/2003 | Islam et al. .................... 709/203 |
| 2004/0098140 A1 * | 5/2004 | Hess ................................. 700/3 |
| 2004/0203686 A1 * | 10/2004 | Bahr .............................. 455/418 |
| 2005/0085277 A1 * | 4/2005 | Chen et al. .................... 455/572 |

(Continued)

*Primary Examiner* — Ronald Eisner (74) *Attorney, Agent, or Firm* — Merchant & Gould P.C.

(57) ABSTRACT

System and method for automatic detection and recovery of malfunction in mobile devices are provided. A mobile device is described, that comprises one or more resources operatively coupled to at least one sensor directly or indirectly coupled to a recovery block. The sensor is configured to monitor at least one of the resources for information, possibly indicative of at least one affected resource, and to report, directly or indirectly this information and/or derivative thereof to the recovery block. In addition, the recovery block is configured to initiate at least one recovery-related action in respect of at least one of the resources in case the received information and/or derivative thereof meets a certain criterion.

20 Claims, 9 Drawing Sheets

(56) References Cited

U.S. PATENT DOCUMENTS

| | | | |
|---|---|---|---|
| 2005/0198552 A1* | 9/2005 | Baba et al. | 714/4 |
| 2007/0055914 A1* | 3/2007 | Chandwani et al. | 714/47 |
| 2007/0094345 A1* | 4/2007 | Rabbers et al. | 709/217 |
| 2009/0125755 A1* | 5/2009 | Herscovitz et al. | 714/15 |

* cited by examiner

Figure 1b

Prior Art

SYSTEM AND METHOD FOR AUTOMATIC DETECTION AND RECOVERY OF MALFUNCTION IN MOBILE DEVICES

CROSS REFERENCE TO RELATED APPLICATIONS

This application claims the benefit of U.S. Provisional Patent Application 60/818,511, titled "System and Method for Detection and Recovery of Malfunction in Mobile Devices" filed on Jul. 6, 2006 which is hereby incorporated by reference herein.

FIELD OF THE INVENTION

This invention relates to mobile devices and, in particular, to methods and systems for maintenance and troubleshooting of the mobile devices operation.

BACKGROUND OF THE INVENTION

Contemporary mobile devices (cellular phones, wireless and handheld computing devices, etc.) are changing from single function devices to integrated open platforms that combine voice, data and video and enable to download and run different type of software applications. Open contain open operating systems (e.g Symbian OS™, Windows® CE, Mobile Linux) with well documented Application to Program Interfaces (APIs) set the ground to many developments of different types of applications, from firmware modules and extensions to the operating system to software and high-level java applications. This is further support with multiple communication channels with higher bandwidth that enable quick software download These changes present a whole set of new opportunities, but at the same time, such devices and networks are subject to a dramatic increase in vulnerability and risk of downloading malfunction software.

This problem has been recognized in Prior Art and various systems have been developed to provide a solution.

SUMMARY OF THE INVENTION

There is a need in the art to provide for a new system and method of malfunction detection and optional automatic recovery for use with mobile devices. The invention, in some of its aspects, is aimed to provide a novel solution to be effective for malfunction of the mobile device, such solution to be capable of discovering malfunction symptoms and enabling an automatic recovery process. In some of its aspects, the invention is further aimed to provide local (intra-device) recovery process with no or minimized escalation to external sources (as, e.g., network-based servers, customer service personal, etc.).

The inventors' analysis of nature of the mobile devices and the need for service continuity and availability results in the requirement for automated diagnostic of malfunction and local decision making and recovery process when possible. The malfunction may be, for example, a result of miss configuration, improper memory usage or other problems occurred while software downloading (e.g. a problem in a new version of an operating system, game, etc.). A corrupted operating system, as well as an application which has interoperability problems with other programs or has internal "bugs", can interrupt the operation of the mobile device or even totally disable its voice, data and/or video functionalities. In many cases the mobile device will not be able to communicate with external servers in order to get software patches or fixed software modules.

In accordance with certain aspects of the present invention, there is provided a method for recovering malfunction of the mobile device or at least one resource of a mobile device, the method comprising:
 a) diagnosing at least one symptom of malfunction and identifying at least one malfunctioned resource of the mobile device:
 and
 b) in response to said diagnosis, recovering at least one resource of the mobile device.

According to other aspects of the present invention there is provided a method for applying a recovery action to one or more malfunctioned resources of a mobile device, the method comprising:
 a) monitoring at least one of said resources for information, possibly indicative of at least one malfunctioned resource of the mobile device, and reporting this information or derivative thereof;
 and
 b) in response to this reporting, initiating at least one recovery-related action in respect of at least one of said resources in case the received information or derivative thereof meet a certain criterion.

The method may further comprise identifying at least one malfunction event and/or identifying at least one malfunctioned resource, and said recovery actions may be provided in escalating extent.

According to other aspects of the present invention there is provided a method of recovering malfunction of one or more resources of a mobile device, the method comprising:
 a) receiving a notification on malfunction event associated with at east one of said resources:
 b) initiating one or more recovery actions in respect to at least one resource for remedying the malfunction, and
 c) in the case of remedying failure, re-initiating one or more recovery actions of escalating extent.

In accordance with other aspects of the present invention, there is provided a mobile device comprising one or more resources operatively coupled to at least one sensor directly or indirectly coupled to a recovery block, wherein said sensor is configured to monitor at least one of said resources for information, possibly indicative of at least one malfunctioned resource, and to report, directly or indirectly, this information and/or derivative thereof to the recovery block; and said recovery block is configured to initiate at least one recovery-related action in respect of at least one of said resources in case the received information and/or derivative thereof meets a certain criterion.

The mobile device may further comprise a fault analysis block operatively coupled with one or more sensors and the recovery block, and configured to receive information from at least one of said sensors, to identify at least one malfunctioned resource, and to report this information and/or derivative thereof to the recovery block.

The mobile device may further comprise at least one WatchDog configured to monitor at least one of said resources for live indication of said resource. The WatchDog may be configured to initiate a reset of at least the monitored resource upon lack of live indication from said resource within a predefined period of time or to perform full restart of the mobile device.

In accordance with further aspects of the present invention, at least one element of a group comprising one or more sensors, the recovery block, the fault analysis block and one or more WatchDogs may be implemented in a chip constituting a part of the mobile device and/or as a software to be run on one or more resources of the mobile device.

Among advantages provided in accordance with certain aspects of the present invention is the ability to facilitate an immune system that will automatically recognize an malfunction and/or the malfunctioned resources and provide automatic or user controlled remedy and/or recovery. This immune system will make the mobile device capable of functioning even if the malfunction is caused by unknown reason.

BRIEF DESCRIPTION OF THE DRAWINGS

In order to understand the invention and to see how it may be carried out in practice, certain embodiments will now be described, by way of non-limiting example only, with reference to the accompanying drawings, in which.

DETAILED DESCRIPTION OF EXEMPLARY EMBODIMENTS

In the following detailed description, numerous specific details are set forth in order to provide a thorough understanding of the invention. However, it will be understood by those skilled in the art, that the present invention may be practiced without these specific details. In other instances, well-known methods, procedures, components and circuits have not been described in detail so as not to obscure the present invention. In the drawings and descriptions, identical reference numerals indicate those components that are common to different embodiments, configurations and/or forms of presentation.

Unless specifically stated otherwise, as apparent from the following discussions, it is appreciated that throughout the specification discussions utilizing terms such as, "processing", "computing", "calculating", "determining", or the like, refer to the action and/or processes of a computer or computing system, or processor, or similar electronic and/or optical computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, flash memory (e.g. Disk-on-Key, memory card), smart cards (e.g. SIM, chip cards, etc.), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being operatively coupled to a computer system bus.

The processes/devices (or counterpart terms specified above) and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The term "malfunctioned resources" used in this patent specification should be expansively construed to cover any resources indicated to be malfunctioned in accordance with received information (and/or derivatives thereof) and/or supposed to be malfunctioned in accordance with certain rules.

The term "criterion" used in this patent specification should be expansively construed to cover any compound criterion, including, for example, several criteria and/or their combination.

The term "malfunction" used in this patent specification should be expansively construed to cover any improper function and/or failure to function of at least one resource of a mobile device caused by any known or unknown reason without known intention to be harmful to the mobile device and/or its resources. The malfunction may be caused by software hugs, authorized download of corrupted or improper configured software, other configuration problems caused by authorized actions, incompatibility with the hardware, operating system or other programs, applications that are "heavy" consumers of resources (e.g. memory, processing) that are either not available or the usage of such resources by one application may interrupt other programs or applications. The term malfunction used in this patent specification does not include a result of an attack caused by known and/or unknown malware on at least one resource of a mobile device.

The term "mobile device" used in this patent specification should be expansively construed to cover any kind of mobile device with communication capabilities, including those adapted for coupling with data, video and/or multimedia terminals. The mobile devices include cellular phones, pagers, radio telephones, cordless telephones, dedicated data units (e.g. PDA), Global Positioning System (GPS) devices, TV-remote control devices, wireless information devices (e.g. car control computers, remote security units, industrial processes control units, remote monitoring units, etc.), wireless adapter devices, play stations, etc. It includes devices able to communicate using mobile radio such as GSM, CDMA, TDMA, GPRS, UMTS, DoPa and any other wireless communications standard, system and/or protocol (e.g. BLUETOOTH®, WIFI™, VIMAX™, InfraRed, VIRELESS™ LAN, etc.) and variants of evolution thereof. The mobile device may communicate with another mobile device or with other devices (e.g. personal computers, servers, etc.) via all possible networks such as, e.g. cellular networks, broadband networks, fixed line network, data communication networks, Internet network, etc. The mobile device may implement any conventional or specialized operating system, for example, Symbian OS™, PALM™ OS, WINDOWS® CE, EPOC™, Mobile LINUX®, DANGER™ HIPTOP® OS, BLACKBERRY® OS, proprietary operating systems of cellular handsets (e.g. by NOKIA®, SAMSUNG®, and others), etc.

The mobile devices may further contain smart cards (e.g. subscriber identity module (SIM), functional chip cards, memory cards, etc.). Such mobile devices are generally used, for example, in GSM, 2.5G/GPRS, 3G/UMTS, DECT, etc.

The term "resource" used in this patent specification should be expansively construed to cover any hardware, software, firmware and/or combined functional element of a mobile device, an application comprising at least one process and utilizing at least one of the functional elements, and any other facility of a mobile device (e.g. operating system, execution environment for application, control, processing or other programs; data sets; files; libraries; etc.) required for its operation, administration and/or maintenance.

The term "sensor" used in this patent specification, should be expansively construed to cover any kind of software, hardware, or/and firmware, and/or combinations thereof capable of monitoring the mobile device and/or at least one of its resources, for information possibly indicative of malfunctioned resources and, accordingly, of suspicious activity.

Figure 1A:
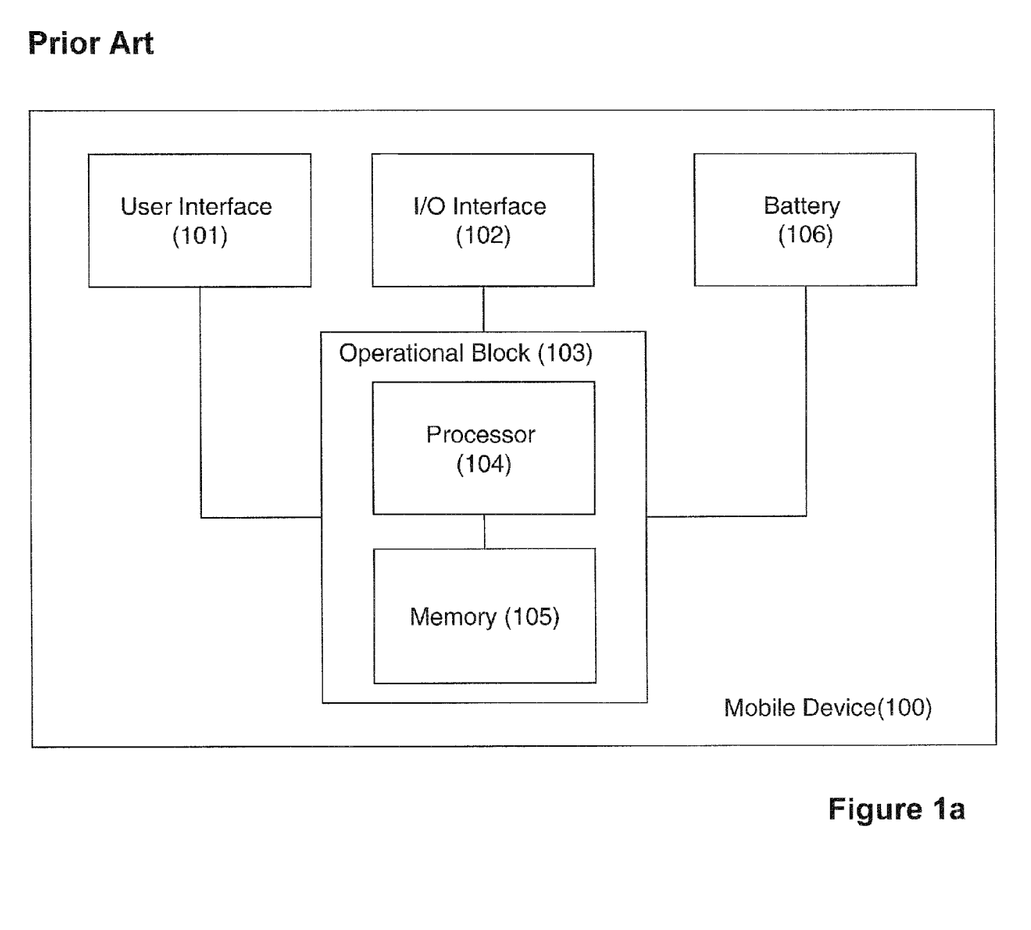
FIGS. 1a and 1b illustrate schematic block diagrams of typical mobile devices as known in the art.

Bearing this in mind, attention is drawn to FIG. 1a illustrating a schematic block diagram of a typical mobile device 100 as known in the art. Typical mobile device 100 accommodates at least one resource.

Referring to FIG. 1a, the mobile device 100 comprises several functional elements: a user interface 101, an input/output interface 102, an operational block 103, a processor 104, a memory 105 and a battery 106. The operational block 103 is operatively coupled to a user interface 101 and to the input/output interlace 102. The battery 106 is feeding the mobile device, corresponding functional elements and a processing thereof. The user interface 101 contains (or is functionally associated with) a display and means for user's input (e.g. keyboard, touch screen, control buttons, etc.). The input/output interface 102 is configured for transmitting/receiving signals to/from different external devices (e.g. external servers, PCs, other mobile devices, etc.). The operational block 103 is capable of managing and controlling the operations and features associated with the mobile device, for example, signal transmitting/receiving, signal processing, voice and data communication, user interface support, etc. The operational block contains the processor 104 coupled to the memory 105. Generally, an operating system is run by the processor 104 from the memory 105. The mobile device 100 is capable of requesting and receiving downloads such as, for example, software programs, files, upgrades, e-mails, etc. from an external server.

Figure 1B:
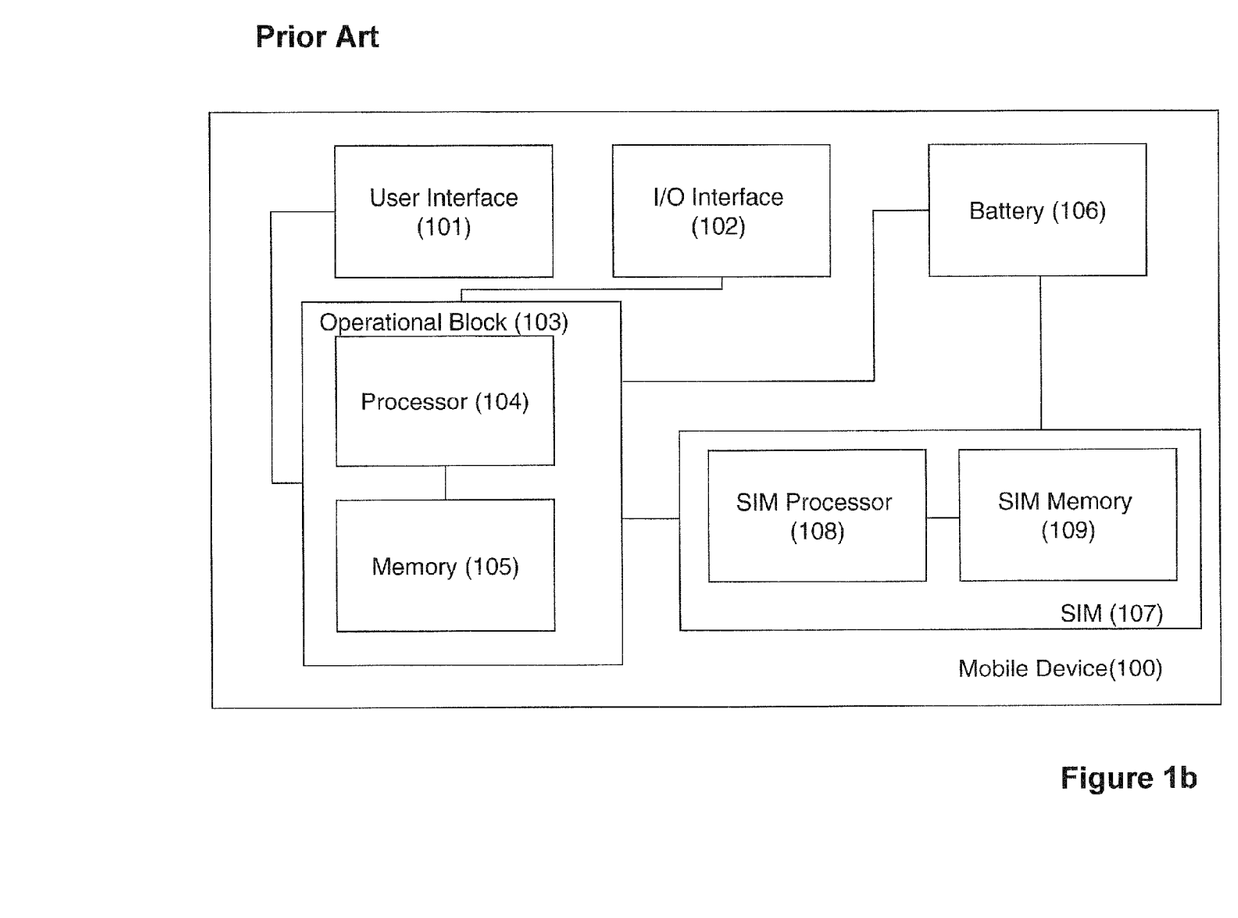

Referring to FIG. 1b, there is illustrated a schematic block diagram of a specific type of mobile device known in the art; namely, the mobile device further containing such functional element as a smart card (e.g. SIM, functional chip cards, etc.). The illustrated mobile device contains Subscriber Identity Module (SIM) 107 operatively coupled to the operational block 103. SIM 107 contains SIM memory 109 operatively coupled with SIM processor 108. Typically, SIM 107 contains user's related information, including user's and device's identification information, personalized settings, phone book, etc.

Both, memory 105 and/or SIM memory 109 may contain firmware and/or application software that are either provided during a manufacture process or later downloaded from an external server owned, for example, by manufacturer, by wireless service provider, by 3$^{rd}$ party, etc.).

It should be noted that the invention is not bound by the specific structure of the mobile devices described with reference to FIGS. 1a and 1b. Those versed in the art will readily appreciate that the invention is, likewise, applicable to any other mobile device.

Figure 2A:
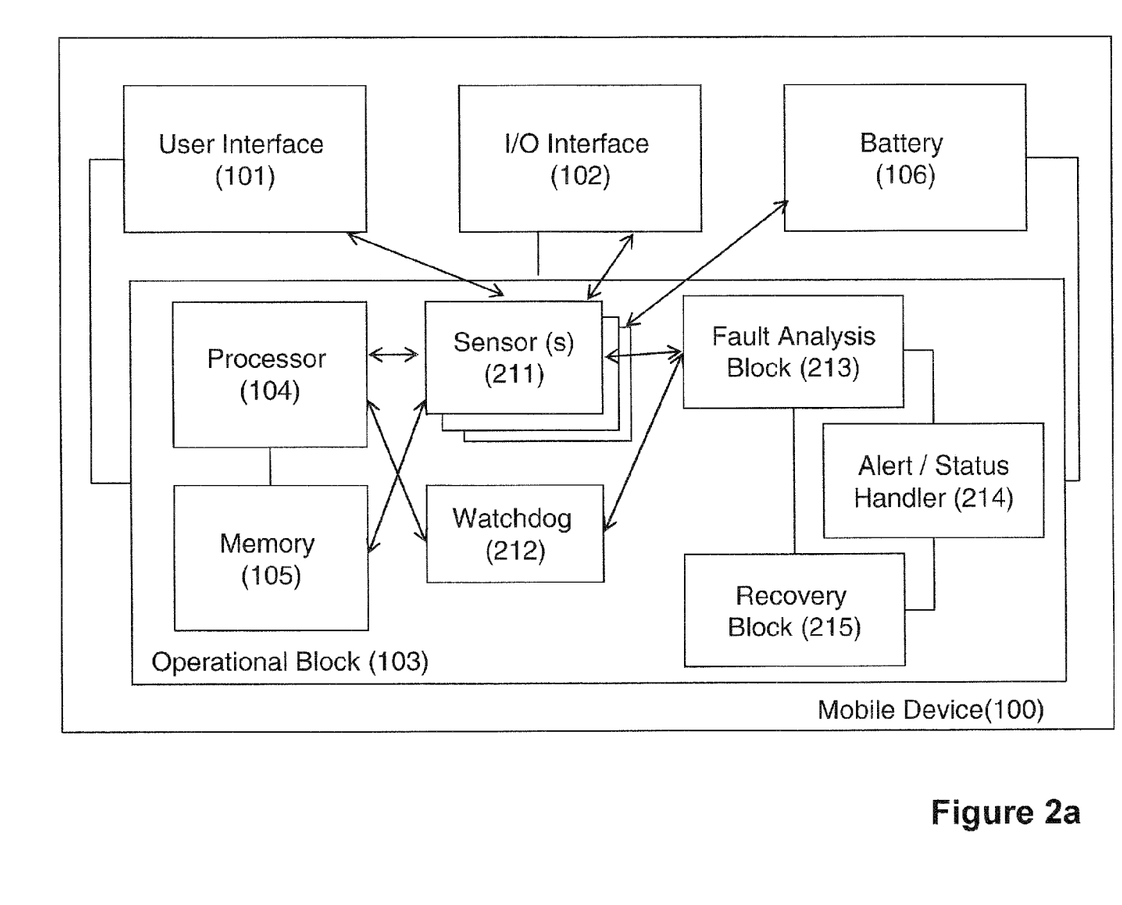
FIGS. 2a and 2b illustrate schematic block diagrams of mobile devices in accordance with certain embodiments of the present invention.
Figure 2B:
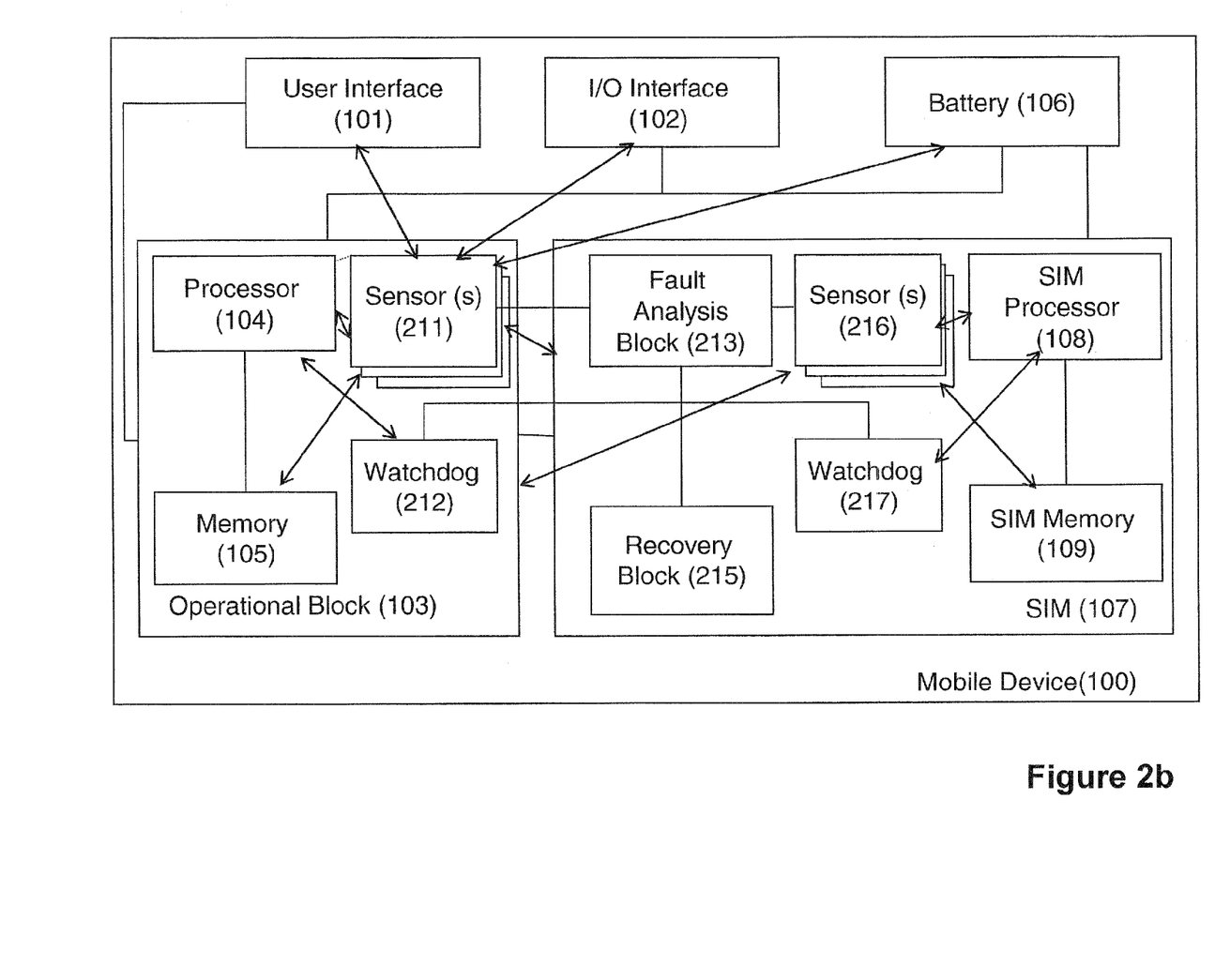

Referring to FIGS. 2a and 2b, there are illustrated schematic block diagrams of mobile devices in accordance with certain embodiments of the present invention. FIG. 2a illustrates a SIM-less embodiment described with reference to FIG. 1a, while FIG. 2b illustrates an embodiment for a mobile device containing SIM as described with reference to FIG. 1b. In accordance with certain embodiments of the present invention, the mobile device 100 is equipped with at least one sensor 211 capable of monitoring at least one resource of the mobile device. Generally, the sensor is external to and/or independent from the resource it senses. There are several ways of monitoring a resource as, for example, through information residing in the system (such as operating system activity tables, memory allocation table, etc.), via communication with the target module to check its status through protocol defined by the specific block or its drivers, by executing an operation on the target block and analyzing the response status or other output, etc.

(see, for example, Microsoft Smartphone Developer's Guide).

It should be noted that the invention is not hound by these examples.

For example, the sensors illustrated in FIGS. 2a and 2b may monitor CPU load, free memory, battery depletion rate, data transmission/receiving rates and their correlation, data integrity (e.g. by content sanity check), code integrity (e.g. by using integrity code that was added during installation or during legitimate load to check if the content is valid), input/output rate to storage (e.g. to phone book, user interface operability (e.g. verify that the keyboard and the screen are functional and not corrupted, etc.). In certain embodiments of the present invention, the sensors may monitor also any other resources and their parameters related to an operation of the mobile device. The sensors may send information and/or derivatives thereof for further analysis, decision(s) and/or action(s) constantly, periodically, on-request and/or if occurs a predefined suspicious event (i.e. when received information and/or derivates thereof meet a certain criterion of suspicious behavior).

In certain embodiments of the present invention, the sensor(s) 211 and/or 216 may contain internal logical units capable of processing the received information and deciding if it meets a certain criterion of a suspicious event. Upon registration of the suspicious event (or a set of suspicious events), the sensors send the received information and/or derivatives thereof to a fault analysis block 213. A criterion of a suspicious event may contain a predefined value/range or combination thereof. For example, the criterion may be a combination of a threshold value with a certain period of time (e.g. more than 98% of the processor load for at least 2 seconds is considered a suspicious event, etc.). In certain embodiments of the present invention, the criterion may be a predefined pattern or/and predefined function, to be compared with monitoring behavior characteristics from at least one sensor (e.g. a sequential spike that loads the CPU more than 90% for at least 100 milliseconds each time and repeats for at least 10 times in 30 minutes; free available memory less than 10% of the available memory for at least 100 milliseconds each time and repeats for at least 10 times in 30 minutes). In certain embodiments of the present invention, a sensor monitoring a functional element may be aware of an application and/or process running in connection with the block. For example, a sensor monitoring the processor may be also aware of running applications (e.g. games, video, etc.). In different embodiments of the invention, upon registration of suspicious behavior, the sensors may send to the fault analysis block at least one of the following content:
  a) all data and/or derivatives thereof received from a monitoring object and meeting the certain criterion,
  b) filtered or processed data and/or derivatives thereof received from a monitoring object and meeting said criterion,
  c) notification of each suspicious event,
  d) notification of a certain suspicious event and/or certain set of suspicious events,
  e) others may also apply.

The fault analysis block 213 is configured to aggregate and analyze information received from several sensors in order to identify the malfunction event and the malfunctioned resources (e.g. blocks, processes, etc.). The analysis of the aggregated information is also helpful for preventing false positive reaction and for defining severity of the problem. Not every suspicious event shall be identified as a malfunction event. For example, running of processor-consuming application (e.g. video) may be a legitimated reason of the processor overload recognized as a suspicious event, but not malfunction event. The fault analysis block may contain predefined criterion/pattern for identification of malfunction event. In certain embodiments of the invention, the fault analysis block may also be configured to provide correlation analysis of data received from different sensors or other adaptive mechanism of malfunction event identification. The correlation analysis of received data may include analysis for predefined states, per predefined rules, and/or per predefined relationships, etc. and may include identification of patterns, common causes, root causes, etc. The fault analysis block 213 may also have capabilities of learning the monitoring behavior of the mobile device and fitting and/or modifying certain criterion accordingly.

In certain embodiments of the invention, the mode of communication between a sensor and the failure analysis block may be configurable and may be different for different sensors or for the same sensor. For example, if sensor A sends to the fault analysis block information about a suspicious event (e.g. about suspicious depletion rate of the battery, high continuous transmission rate, etc.), in order to identify the problem, the fault analysis block may request another sensor(s) (e.g. sensor B) for information (e.g. which applications are being run by the processor). In this case sensor B will send the information per request, and not upon suspicious event registered by this sensor.

In certain embodiments of the present invention, the sensors (or some of them) may be implemented with no logical capabilities; and the fault analysis block may be configured to analyze the information received from the sensors (either in pull or push mode) also in order to define suspicious events.

The fault analysis block is operatively coupled with a recovery block 215 capable of facilitating at least one recovery-related action.

In certain embodiments of the present invention, the fault analysis block is optional and the sensors (or some of them) may send information directly to the recovery block. The functionality of the fault analysis block may be not implemented or implemented (partly or entirely), divided between the sensors and the recovery block. The operation of the recovery block will be further detailed with reference to FIG. 4.

In certain embodiments of the invention, the fault analysis block 213 and/or recovery block 215 are operatively coupled to an alert/status handler 214. Upon identification of malfunction event, the failure analysis block forwards the information to the alert/status handler which is configured to send an alert via at least one of different types of media available to the mobile device under conditions of current malfunction. The alerts may be sent to predefined external system(s) (e.g., management system, central monitoring device, etc.) in a format matching the system and may contain notification and/or information about the malfunction event. In certain embodiments of the present invention the alert/status handler may also contain an information log (not presented in FIGS. 1 and 2). In certain embodiments of the present invention, the information log may be also located in the memory 105 or in the SIM memory 109 or be distributed between different modules.

In certain embodiments of the invention, the mobile device 100 may also contain a WatchDog 212. The term WatchDog used in this patent specification, should be expansively construed to cover any kind of software, hardware, firmware and/or combinations thereof operatively connected to a processor and capable of registering the processor malfunctions resulting in stop-responding. The WatchDog senses periodically the operation of the processor and its operating system, and/or the processor and/or applications running on the processor through signals sent periodically to the WatchDog. If the WatchDog doesn't receive this signal within the set period of time, it would initiate immediate recovery activities such as, for example, reset the system and/or restore configuration. The WatchDog may also report the failure to the fault analysis block 213 which initiates additional recovery activities subject to the fault analysis results. In certain embodiments of the invention, if the WatchDog doesn't receive said signal within the set period of time, it may just report to the recovery block 215 which will activate the recovery activities.

Attention now is drawn to FIG. 2b illustrating, by way of non-limiting example, certain embodiments of the present invention for use in a SIM-comprising mobile device. In the illustrated embodiment, the SIM 107 contains sensor(s) 216 and WatchDog 217 operatively connected with the SIM processor 108. The sensors 216 are configured to monitor SIM processor 108, SIM memory 109 and overall operational block 103 (e.g. activity of the operating system). The sensors 211 are configured to monitor also SIM 107.

Those skilled in the art will readily appreciate that the invention is not hound by the configuration of FIGS. 2a and 2b; equivalent and/or modified functionality may be consolidated or divided in another manner. The present invention may be implemented for SIM-comprising mobile devices in a manner illustrated for SIM-less mobile devices. Also the present invention may be implemented for the mobile devices comprising other than SIM smart cards in a manner described in the reference to SIM-comprising mobile devices.

In certain embodiments of the present invention, at least part of the recovery initiating functionality may be also implemented within the sensors. The sensors may contain recovery script associated with and triggered by certain suspicious events or combinations thereof. In such case, when the event occurs, the script operates.

Figure 3A:
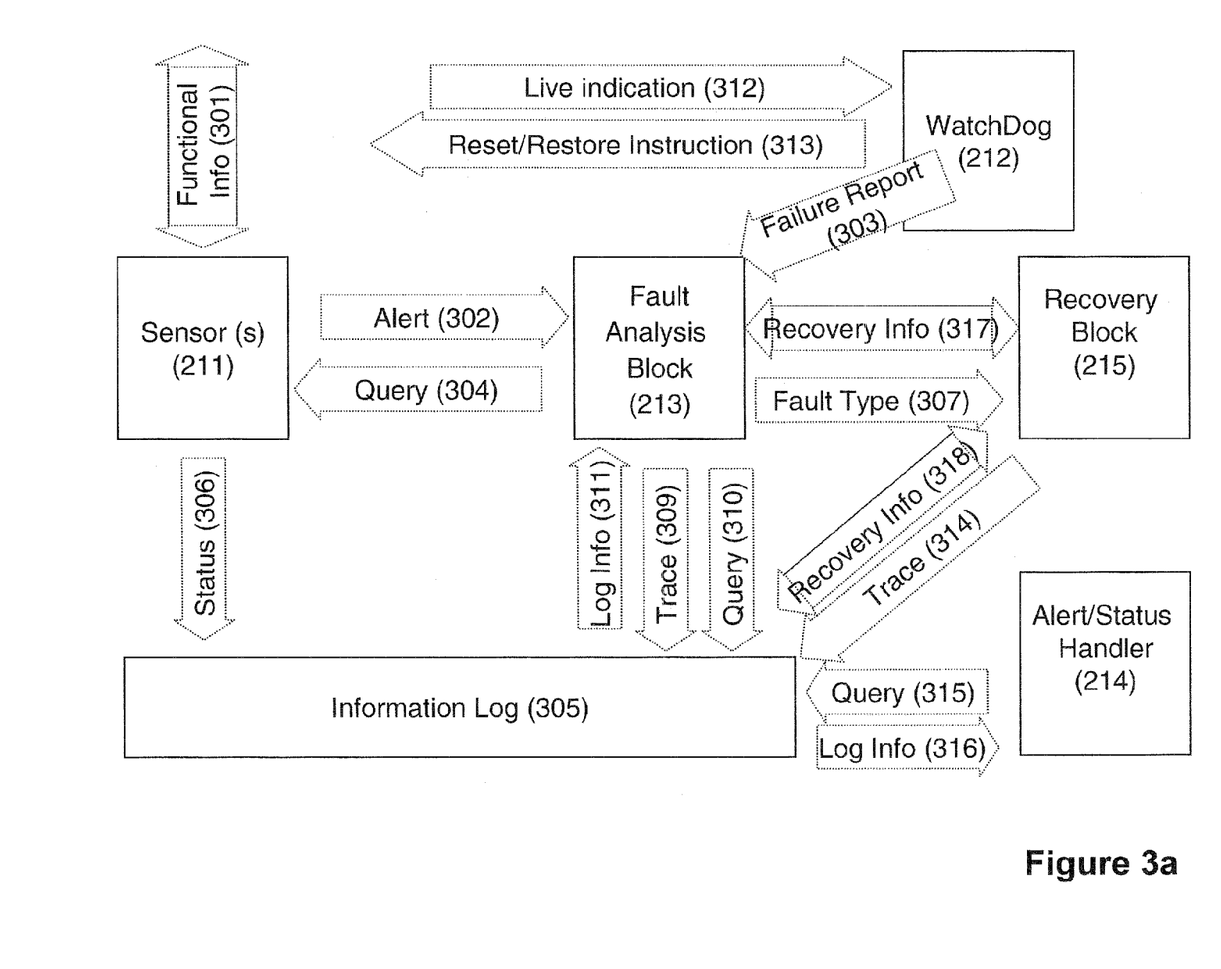
FIG. 3a illustrates a generalized diagram of operational interfaces in accordance with certain embodiments of the present invention.

Referring to FIG. 3a, there is illustrated a non-limiting example of a generalized diagram of operational interfaces in accordance with certain embodiments of the present invention.

The sensor 211 interfaces the monitoring module(s), process(s) and/or application(s) to receive operational information for further analysis 301. In case of a suspicious event, the sensor sends an alert 302 to the fault analysis block 213. This alert may also contain data and/or derivatives thereof sampled by the sensor. The fault analysis block may also initiate retrieving up-to-date status and sampled data and/or derivatives thereof by sending a query 304 to the sensor. The sensor may also interface the information log 305 for sending (constantly, periodically and/or per predefined criterion) the status info to be saved in the log.

The fault analysis block 213 analyzes the information received from the sensor(s) in order to define the malfunction event, its severity, malfunctioned resources and/or a type of fault, and reports 307 the results to the recovery block. The fault analysis block may use, for example, a look-up table in order to determine if and what validation operations (e.g. integrity checks, memory allocation check, etc.) are required, which resource(s) and what type of resource(s) may be malfunctioned, etc. For example, upon CPU overload, it may check which processes consume exceptionally high CPU process load. If such processes are found, it will further check if such consumption is "valid" by the specific processes. The fault analysis block also sends information to the information log 305 for tracing 309 the fault analysis operation and decisions. The fault analysis block may also send a query 310 to the log and receive corresponding information 311.

The WatchDog (212 and/or 217) continuously receives a live indication 312 from the monitoring CPU(s) and/or OS and, upon a failure (if at least one of the monitored resources is not running), sends a reset/restore instruction 313. The WatchDog interfaces the fault analysis block 213 for sending failure reports 303; and, optionally, interfaces the recovery block 215 for sending a recovery trigger (not shown) if the recovery is to be facilitated by the recovery block.

The recovery block 215 interfaces the fault analysis block (and, optionally, with the WatchDog(s)) for receiving the malfunction information 307; and interfaces the information log for tracing 314 the recovery decisions and operation.

The information log 305 maintains historical information on status of sensors and/or decisions and operations of the fault analysis block and the recovery block. This information may be sent to an external system by the alert/status handler. The alert/status handler 214 may also send a query 315 to the log and receive 316 corresponding information.

In certain embodiments of the invention, the recovery block 215 may also interface the fault analysis block 213 for requesting and receiving information 317 during a recovery process. In certain embodiments of the present invention, the recovery block 215 may request and receive information 318 for recovery process via interface with the information log 305.

The functionality disclosed in the present invention may be implemented in several ways, for example:
  partly or entirely in hardware (e.g. ASIC—Application Specific Integrated Circuit that is designed to implement such a feature. Such ASIC may be a self-contained component or integrated into hardware component that implements other functionalities such as a CPU, a co-processor or any other component);
  partly or entirely in software;
  partly or entirely in microcode/firmware (e.g. as a set of software instructions directly operating machine code and optimized for fast execution);
  combination of the above (e.g. some parts of the system may be implemented within CPU or other components with processing capability, e.g., ASIC; other parts may be implemented in micro-code and the rest in software as illustrated in FIG. 3b.

Figure 3B:
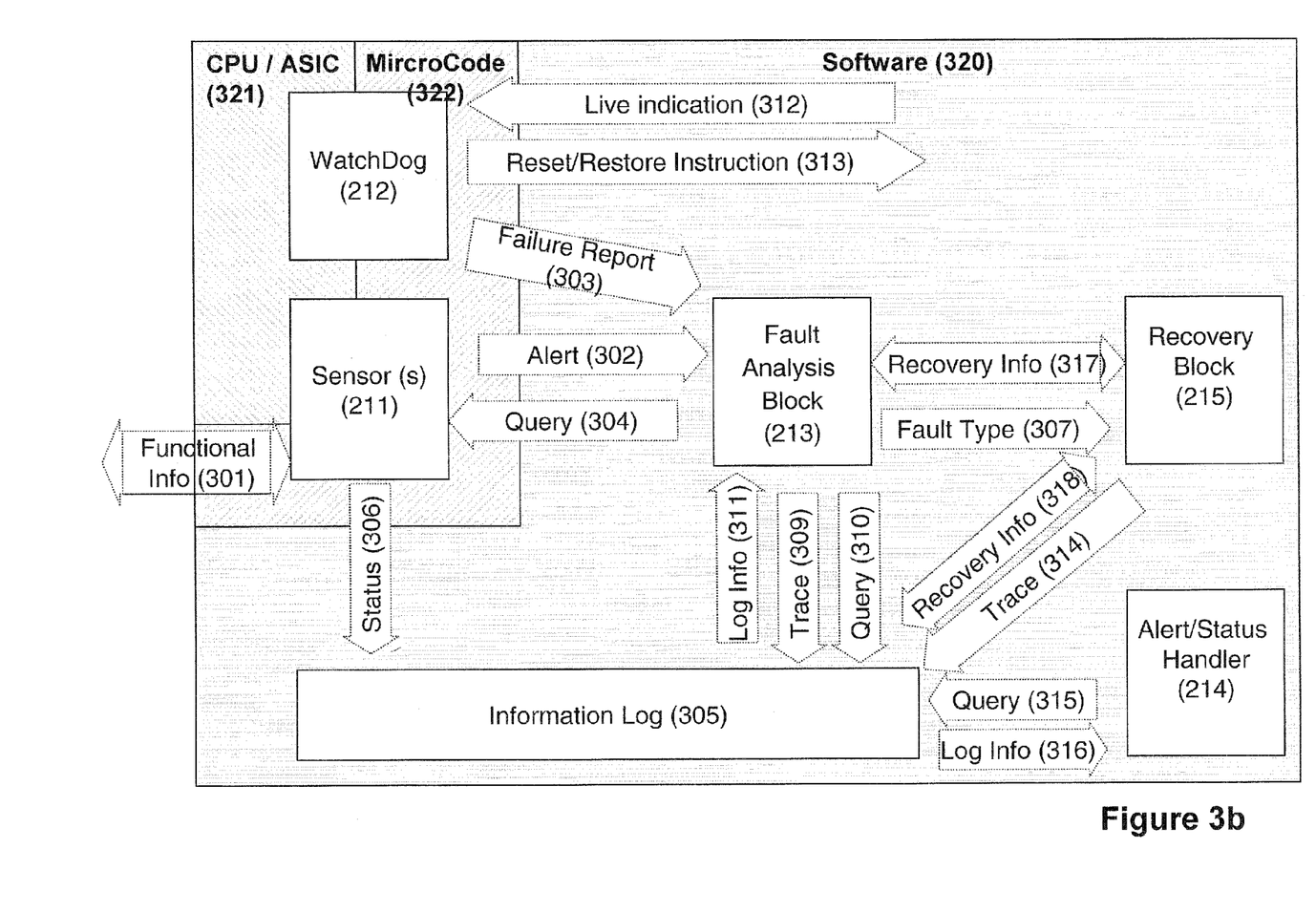
FIG. 3b illustrates the generalized diagram illustrated in FIG. 3a with exemplified implementation divided between software, firmware and hardware in accordance with certain embodiments of the present invention.

FIG. 3b illustrates the generalized diagram illustrated in FIG. 3a with exemplified implementation divided between software, firmware and hardware in accordance with certain embodiments of the present invention: some of the sensors are implemented in ASIC, the sensors are monitored and operated through interface micro-code programs, while the other blocks of the system are implemented by software. In certain embodiments of the invention the implementation of at least part of the functionalities in ASIC and/or Microcode may be provided within the main CPU, one or more peripheral components with processing capabilities, within the SIM and/or in combination thereof.

In certain embodiments of the present invention the entire functionalities or at least part thereof (e.g. one or more sensors and the recovery block) may be implemented in a chip or/and in a smart card. Said chip/smart card may constitute a part of the mobile device or part of another device to be operatively coupled with the mobile device.

In certain embodiments of the present invention the entire functionalities or at least part thereof (e.g. one or more sensors and the recovery block) may be implemented as a software. Said software may run on one or more resources of the mobile device and/or of another device operatively coupled to the mobile device.

Figure 4:
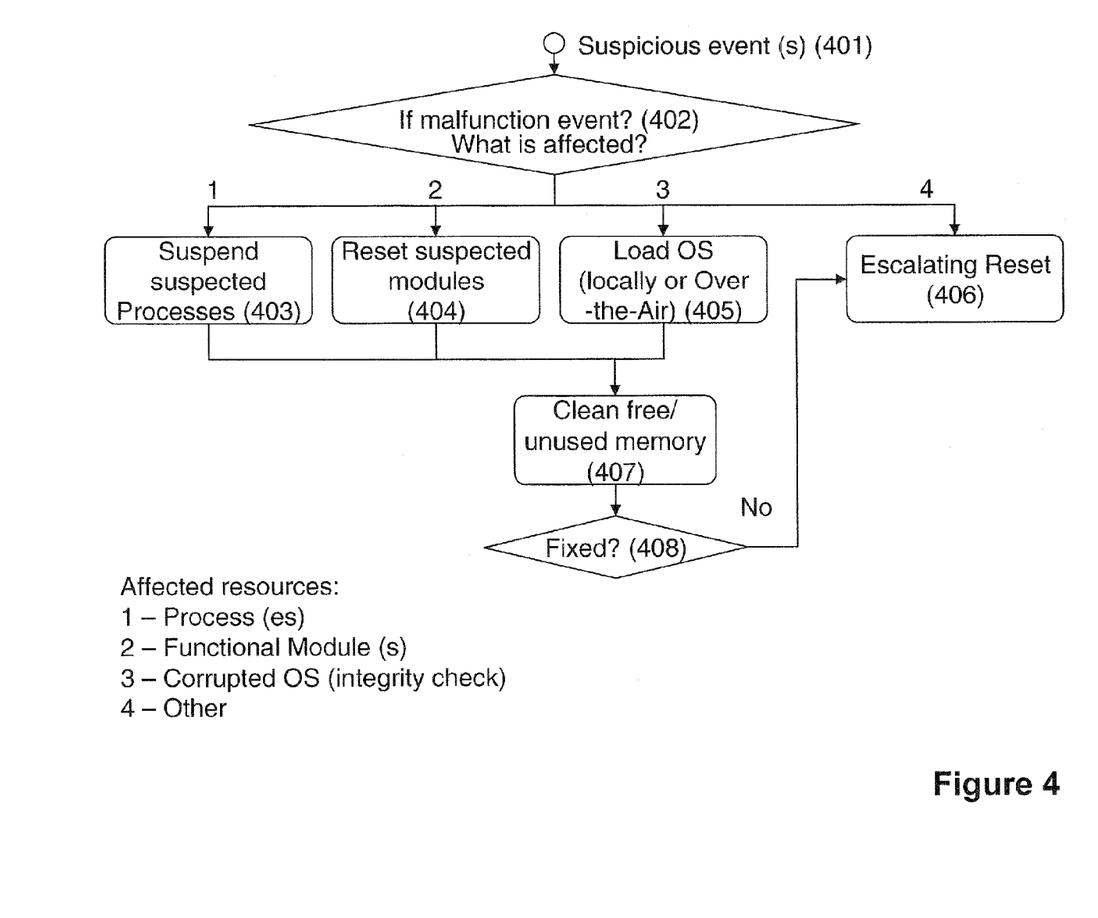
FIG. 4 is a generalized flow chart of recovery steps in accordance with certain embodiments of the present invention.

Referring to FIG. 4, there is illustrated a generalized flow chart of recovery steps in accordance with certain embodiments of the present invention. When the fault analysis block receives information on a suspicious event 401 from the sensor(s), it checks 402 whether said event is malfunction, what is malfunctioned and informs the recovery block. The recovery block initiates recovery steps in accordance with malfunctioned resources. For example, the recovery block may initiate suspending suspected process(es) 403 and reset the suspected modules 404. If the operating system (OS) is corrupted, the recovery block may initiate OS reloading 405 locally or remotely (e.g. over-the-air).

The reloading may be implemented by using different techniques, for example as disclosed in US Patent Application No. 2005/079,863; U.S. Pat. No. 6,549,771; U.S. Pat. No. 6,215,994, US Patent Application No. 2005/064,847 and/or others.

US Patent Application No. 2005/079,863 discloses over-the-air provisioning of mobile device settings. In response to a request for mobile service subscription options received from the mobile device, data relating to mobile service subscription options, for selection by a user of the mobile device, may be sent to the mobile device over a wireless communication path. A selection of one or more subscription options may be received from the mobile device over the wireless communication path, and a service corresponding to the selected subscription options may be activated in response to the selection. Settings associated with the selected subscription options may be downloaded over-the-air to the mobile device, which may store the settings to enable the mobile device to access the subscription.

U.S. Pat. No. 6,549,771 discloses a method and system for programming a mobile telephone over the air within a mobile telephone communication network. The mobile telephone communication network includes an over-the-air function, a customer service center, a mobile switching center, a base station controller, and multiple base transceiver stations. The over-the-air function, using the mobile switching center, the base station controller, and one of the base transceiver stations for transport, initially sends a request over-the-air to a mobile telephone within the mobile telephone communication network to interrogate the mobile telephone's protocol capability. In response to the request, the mobile telephone sends a protocol capability response message over-the-air back to the over-the-air function. The protocol capability response message includes a BAND_MODE_CAP field that describes the hand and mode capability information of the mobile telephone. In addition, the protocol capability response message may also include a SERVICE_OPTION field that describes the service options supported by the mobile telephone.

U.S. Pat. No. 6,215,994 discloses a system and method for over-the-air programming of mobile stations. The mobile station includes a memory storing user preference information, a receiver adapted to receive an over-the-air information signal including user preference information, and a user preference program in the mobile station adapted to change the user preference information in the memory according to user preference information in a received over-the-air information signal. The mobile station is remote from a master control unit selectively capable of being activated for transmitting the over-the-air information including select user preference information input at the master control unit.

US Patent Application No. 2005/064,847 discloses a system and method for over-the-air modifying the area code upon authorization from the carrier. The wireless communication device contains a table of valid area codes in persistent memory. The table defines the complete set of area codes that can be used by the wireless communication device. The wireless device is capable of receiving an instruction from the network that causes the current area code to be changed to a new area code from the table of valid area codes. Alternatively, the wireless device is capable of receiving an instruction from the network that causes the current table of area codes to be replaced with a new table of area codes that is received from the network along with the instruction. After installation of the new table of valid area codes, the wireless communication device can be instructed to change from the current area code to a new area code in the new table of valid area codes.

The steps 403-405 are followed by cleaning 407 free/unused memory (e.g. writing an arbitrary value to this memory) and testing 408 if the problem has been fixed (e.g. by requesting the fault analysis block or/and information log). If the problem still exists, the recovery block will activate 406 a process of escalating reset further described with reference to FIG. 6. If the malfunctioned resources are other than a process, a module and/or OS (e.g., configuration problems, full memory caused by non-identified task. CPU overloaded by non-identified process, etc.), the recovery block will activate 406 the process of escalating reset.

Figure 5:
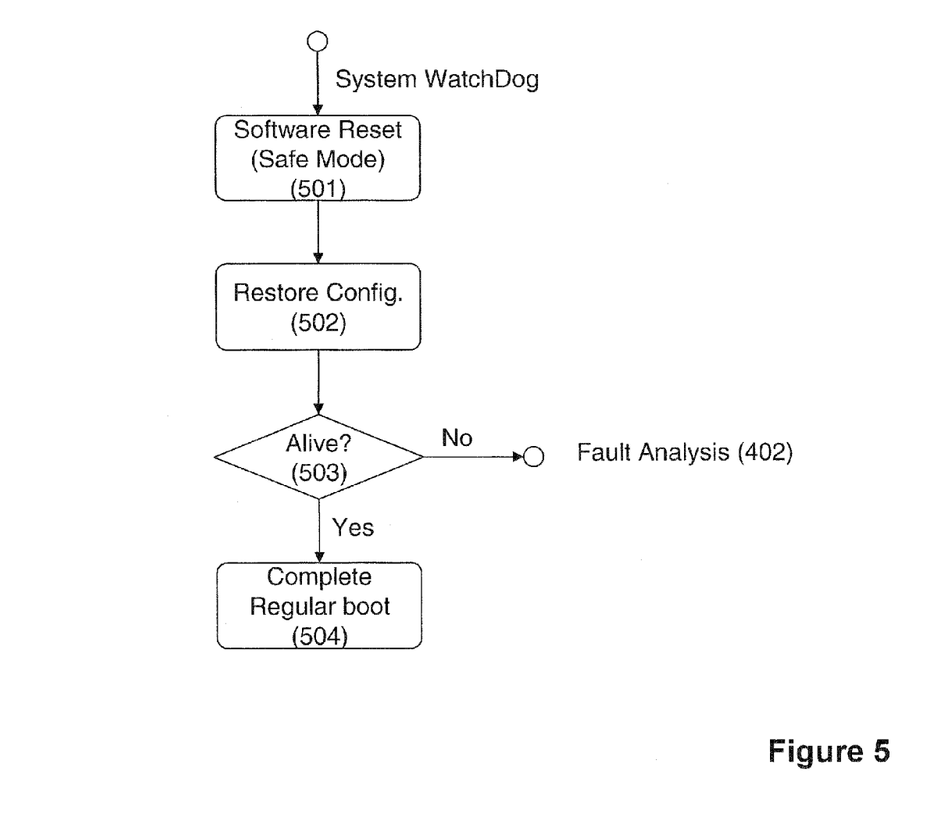
FIG. 5 is a generalized flow chart of WatchDog initiated recovery in accordance with certain embodiments of the present invention.

FIG. 5 illustrates a generalized flow chart of recovery initiated by the WatchDog in accordance with certain embodiments of the present invention.

If the WatchDog does not receive a live indication from the monitored CPU(s) and/or OS within the set period of time, it will initiate software reset 501 followed by controlled and gradually reboot of the operating system and by configuration restore 502. If later testing 503 does not provide a live indication, the WatchDog will inform the Fault Analysis Block about a suspicious event needed to be handled in accordance, with the procedure described with reference to FIG. 4. Upon success of reset/restore activities, the system will complete a regular boot 504.

Figure 6:
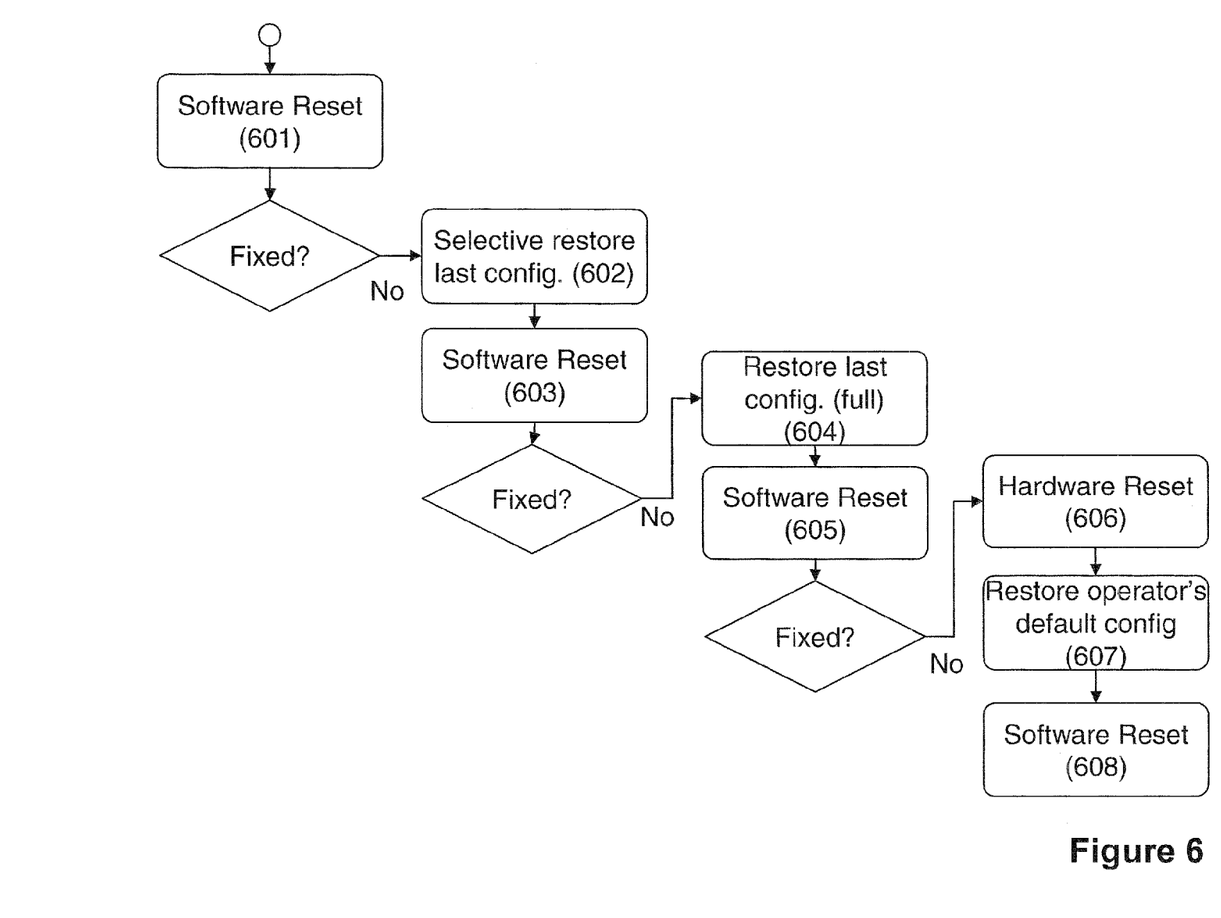
FIG. 6 is a generalized flow chart of escalating reset in accordance with certain embodiments of the present invention.

Referring now to FIG. 6, there is illustrated a generalized flow chart of escalating reset in accordance with certain embodiments of the present invention. The escalating reset starts with a software reset of the system 601. The further escalating action is to provide a restore of configuration 604 followed by software reset 605. (Optionally, this step may be divided into two stages: selective restore of previous configuration (e.g. configuration of the malfunctioned modules only) 602 followed by software reset 603 and, if not fixed, full configuration restore). If the problem still exists, the next action of escalating extent is to provide hardware reset 606, restore the operator's default configuration 607 and provide next software reset 608.

It should be noted that the invention is not bound by the specific actions described with reference to FIG. 6 and other actions of escalating extent may be pre-configured for recovery process.

For example, the actions of escalating extent may be selected from the following group:
a) reboot the mobile device software;
b) reboot the mobile device software gradually;
c) reset at least one functional element of the mobile device;
d) reboot the entire mobile device;
e) restore a previous configuration of at least one malfunctioned resource;
f) restore a previous configuration of all malfunctioned resources;
g) restore of the previous configuration of all resources;
h) reinstall at least one applications from a local source;
i) reinstall at least one application from a remote source;
j) reinstall at least one driver from a local source;
k) reinstall at least one driver from a remote source;
l) reinstall at least part of the operating system from a local source;
reinstall at least part of the operating system from a remote source;
n) reinstall the entire software of the mobile device from a local source;
o) reinstall the entire software of the mobile device from a remote source;
p) restore a default configuration as set by the operator of the mobile device;
q) restore a default configuration as set by the manufacturer of the mobile device;
r) restore the user's data that is stored within in the mobile device; and
s) restore a the user's data from a remote backup source.

It is also to be noted that in certain embodiments of the invention initiating of each of recovery action may be initiated with no involvement of any factor external to the mobile device, while in other embodiments initiating at least part of recovery actions requires involvement of at least one external factor (e.g. for authorization, confirmation of availability, etc.). In certain embodiments of the invention at least part of recovery actions may be provided with no involvement of any factor external to the mobile device.

It will also be understood that the system according to the invention, may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

It is also to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based, may readily be utilized as a basis for designing other structures, methods, and systems for carrying out the several purposes of the present invention.

Those skilled in the art will readily appreciate that various modifications and changes can be applied to the embodiments of the invention as hereinbefore described without departing from its scope, defined in and by the appended claims.

The invention claimed is:

1. A mobile device comprising at least one resource operatively coupled to at least one sensor coupled to a recovery block and to a fault analysis block, the fault analysis block being coupled with the recovery block, the at least one resource including at least one hardware resource of the mobile device, wherein:
    a) said at least one sensor monitoring said at least one resource including said at least one hardware resource for a first pattern, and for a predefined pattern indicative of at least one affected resource, said at least one sensor including a logical unit for comparing said first pattern to the predefined pattern, and for deciding whether said first pattern compared to the predefined pattern meets predefined criteria of a suspicious event relating to at least said at least one hardware resource of the mobile device, wherein upon registration of said suspicious event by said at least one sensor, said at least one sensor sends content relating to said suspicious event to said fault analysis block, said fault analysis block analyzing whether said suspicious event is to be identified as a non-malfunction event; preventing a false positive reaction to said suspicious event by said mobile device when said suspicious event is identified as a non-malfunction event, said recovery block receiving notification when said suspicious event is identified as a malfunction event, and
    b) said recovery block initiating at least one recovery-related action with respect to said at least one resource upon receiving the notification, wherein said at least one recovery-related action is starts with restoring of previous configuration of malfunctioned modules only, followed by a reset of at least one software resource, followed by restoring a previous configuration of all modules and in case said malfunction event still exists, said recovery-related action follows to said at least one hardware resource.

2. The mobile device according to claim 1 wherein said mobile device is a cellular phone.

3. A method for detection and recovery of a malfunction of at least one resource of a mobile device, the at least one resource including at least one hardware resource of the mobile device, the method comprising the procedures of:
    monitoring said at least one resource that includes said at least one hardware resource for a first pattern and for a predefined pattern indicative of at least one affected resource;
    comparing said first pattern to said predefined pattern;
    deciding on whether said first pattern compared to said predefined pattern meets predefined criteria of a suspicious event relating to at least said at least one hardware resource of the mobile device;
    analyzing whether said suspicious event is to be identified as a non-malfunction event preventing a false positive reaction to said suspicious event in identification of a malfunction event by said mobile device when said suspicious event is identified as a non-malfunction event;
    receiving notification when said suspicious event is identified as a malfunction event; and
    initiating at least one recovery-related action with respect to said at least one resource upon receiving the notification, wherein said at least one recovery-related action starts with restoring of a previous configuration of malfunctioned modules only, followed by a reset of at least one software resource, followed by restoring a previous configuration of all modules, and in case said malfunction event still exists, said recovery-related action follows to said at least one hardware resource.

4. The method according to 3, wherein the mobile device is a cellular phone.

5. The method according to 3, wherein said at least one recovery-related action is initiated with no involvement of any factor external to the mobile device.

6. The method according to claim 3, further comprising the procedure of sending an alert to at least one predefined external system, upon identification of said malfunction event.

7. The method according to claim 6, wherein said predefined external system is a management system.

8. The method according to claim 6, wherein said predefined external system is a central monitoring device.

9. The method according to claim 3, further comprising the procedure of re-initiating one or more recovery actions.

10. The method according to claim 9, wherein said one or more recovery actions is selected from the list comprising:
    reboot of software of said mobile device;
    gradual reboot of software of said mobile device;
    resetting of at least one functional element of said mobile device;
    restoration of a previous configuration of said at least one malfunctioned said resource;
    restoration of previous configuration of at least one resource;
    reinstallation of at least one application from a local source;
    reinstallation of at least one application from a remote source;
    reinstallation of at least one driver from a local source;
    reinstallation of at least on driver from a remote source;
    reinstallation of at least part of the operating system from a local source;
    reinstallation of at least part of the operating system from a remote source;
    reinstallation of entire software of said mobile device from a local source;
    reinstallation of entire software of said mobile device from a remote source;
    reinstallation of default configuration as set by an operator of said mobile device;
    restoration of default configuration as set by the manufacturer of said mobile device;
    restoration of user data stored in said mobile device; and
    restoration of user data from a remote backup source.

11. The method according to claim 3, wherein said suspicious event is selected from a list consisting of:
    substantial processor load of said mobile device;
    running of a processor-consuming application on said mobile device;
    a particular depletion rate of a battery of said mobile device; and
    a high continuous transmission rate.

12. The method according to claim 3, wherein said resource is selected from a list consisting of:
    said at least one hardware resource of said mobile device;
    software of said mobile device;
    firmware of said mobile device;
    functional element of said mobile device; and
    data sets, files and libraries of said mobile device.

13. The method according to claim 3, wherein said monitoring is selected from a list consisting of:

information residing in the operating system of said mobile device;
communication with a target module;
execution of an operation on a target block and analyzing the response thereof;
central processing unit (CPU) load;
free memory;
battery depletion rate;
data transmission rate;
data receiving rate;
correlation between data transmission rate and data receiving rate;
data integrity;
code integrity;
input rate to storage;
output rate to storage; and
interface operability.

14. The mobile device according to claim 1, wherein said mobile device further comprises an alert or status handler coupled to either one of said fault analysis block and said recovery block, said alert or status handler sends an alert to at least one predefined external system, upon identification of said malfunction event.

15. The mobile device according to claim 14, wherein said predefined external system is a management system.

16. The mobile device according to claim 14, wherein said predefined external system is a central monitoring device.

17. The mobile device according to claim 1, wherein said suspicious event is selected from a list consisting of:
  substantial processor load of said mobile device;
  running of a processor-consuming application on said mobile device;
  a particular depletion rate of a battery of said mobile device; and
  a high continuous transmission rate.

18. The mobile device according to claim 1, wherein said resource is selected from a list consisting of:
  said at least one hardware resource of said mobile device;
  software of said mobile device;
  firmware of said mobile device;
  functional element of said mobile device; and
  data sets, files and libraries of said mobile device.

19. The mobile device according to claim 1, wherein said monitoring is of the elements selected from a list consisting of:
  Information residing in the operating system of said mobile device;
  communication with a target module;
  execution of an operation on a target clock and analyzing the response thereof;
  central processing unit (CPU) load;
  free memory;
  battery depletion rate;
  data transmission rate;
  data receiving rate;
  correlation between data transmission rate and data receiving rate;
  data integrity;
  code integrity;
  input rate to storage; and
  output rate to storage.

20. A mobile device comprising at least one resource operatively coupled to at least one sensor coupled to a recovery block and to a fault analysis block, the fault analysis block being coupled with the recovery block, the at least one resource including at least one hardware resource of the mobile device, wherein:
  a) said at least one sensor monitoring said at least one resource that includes said at least one hardware resource for a first pattern, and for a predefined pattern indicative of at least one affected resource, said at least one sensor including a logical unit for comparing said first pattern to the predefined pattern and for deciding whether said first pattern compared to the predefined pattern meets predefined criteria of a suspicious event relating to at least said at least one hardware resource of said mobile device, wherein upon registration of said suspicious event by said at least one sensor, said at least one sensor sends content relating to said suspicious event to said fault analysis block, said fault analysis block analyzing whether said suspicious event is to be identified as a non-malfunction event, preventing a false positive reaction to said suspicious event by said mobile device when said suspicious event is identified as a non-malfunction event; said recovery block receiving notification when said suspicious event is identified as a non-malfunction event,
  said fault analysis block analyzing whether said suspicious event is to be identified as a malfunction event, preventing a false negative reaction to said suspicious event in the identification of a non-malfunction event by said mobile device; said recovery block receiving said information identified as said malfunction event, and
  b) said recovery block initiating at least one recovery-related action with respect to said at least one resource upon receiving the notification, wherein said at least one recovery-related action is starts with restoring of previous configuration of malfunctioned modules only, followed by a reset of at least one software resource, followed by restoring a previous configuration of all modules and in case said malfunction event still exists, said recovery-related action follows to said at least one hardware resource.

* * * * *